US012591682B2

(12) United States Patent
Liu

(10) Patent No.: US 12,591,682 B2
(45) Date of Patent: Mar. 31, 2026

(54) AUTOMOTIVE SECURE BOOT WITH SHUTDOWN MEASURE

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 125 days.

(21) Appl. No.: 17/871,839

(22) Filed: Jul. 22, 2022

(65) Prior Publication Data

US 2024/0028737 A1 Jan. 25, 2024

(51) Int. Cl.
*G06F 21/00* (2013.01)
*G06F 21/57* (2013.01)

(52) U.S. Cl.
CPC .......... *G06F 21/575* (2013.01); *G06F 21/572* (2013.01); *G06F 2221/034* (2013.01)

(58) Field of Classification Search
CPC . G06F 21/575; G06F 21/572; G06F 2221/034
See application file for complete search history.

(56) References Cited

U.S. PATENT DOCUMENTS 5,481,756 A * 1/1996 Kanno .................... G06F 13/28
710/22
2004/0003167 A1* 1/2004 Kimura .................. G11C 16/26
711/103

2009/0172373 A1* 7/2009 Lopes ..................... H04L 69/12
713/1
2014/0040605 A1* 2/2014 Futral ..................... G06F 9/445
713/2
2016/0357963 A1* 12/2016 Sherman ............... G06F 21/556

FOREIGN PATENT DOCUMENTS

WO WO-2022044664 A1 * 3/2022 ............. G06F 21/44

* cited by examiner

*Primary Examiner* — Ghazal B Shehni
(74) *Attorney, Agent, or Firm* — Greenberg Traurig

(57) ABSTRACT

In some aspects, the techniques described herein relate to a system including: a storage array; a controller, the controller configured to detect booting of the system; and an auto-measure circuit configured to: read a status register, the status register storing a state of data stored in the storage array, measure the data to generate a measurement, if a value stored in the status register indicates the data is compromised, compare the measurement to a golden measurement, halt booting if the measurement does not match the golden measurement, and continue booting if the measurement matches the golden measurement. Further, the method can include measuring the data to generate a second measurement upon shutdown, comparing the second measurement to the value of the golden measurement register, and update the status register as negative if the second measurement does not match the value of the golden measurement register or positive otherwise.

18 Claims, 6 Drawing Sheets

200

500

AUTOMOTIVE SECURE BOOT WITH SHUTDOWN MEASURE

FIELD OF THE TECHNOLOGY

At least some embodiments disclosed herein generally relate to memory devices (e.g., semiconductor memory devices) and, in particular, to improvements in securely booting devices utilizing such devices.

BACKGROUND

Various computing devices utilize securing booting procedures to ensure that installed firmware or software is valid before fully booting. Examples of such techniques are referred to as secure booting or measured booting. Currently, in automotive environments, such booting techniques cannot be used due to the latency incurred by securely booting each layer of the system.

DETAILED DESCRIPTION

Figure 1:
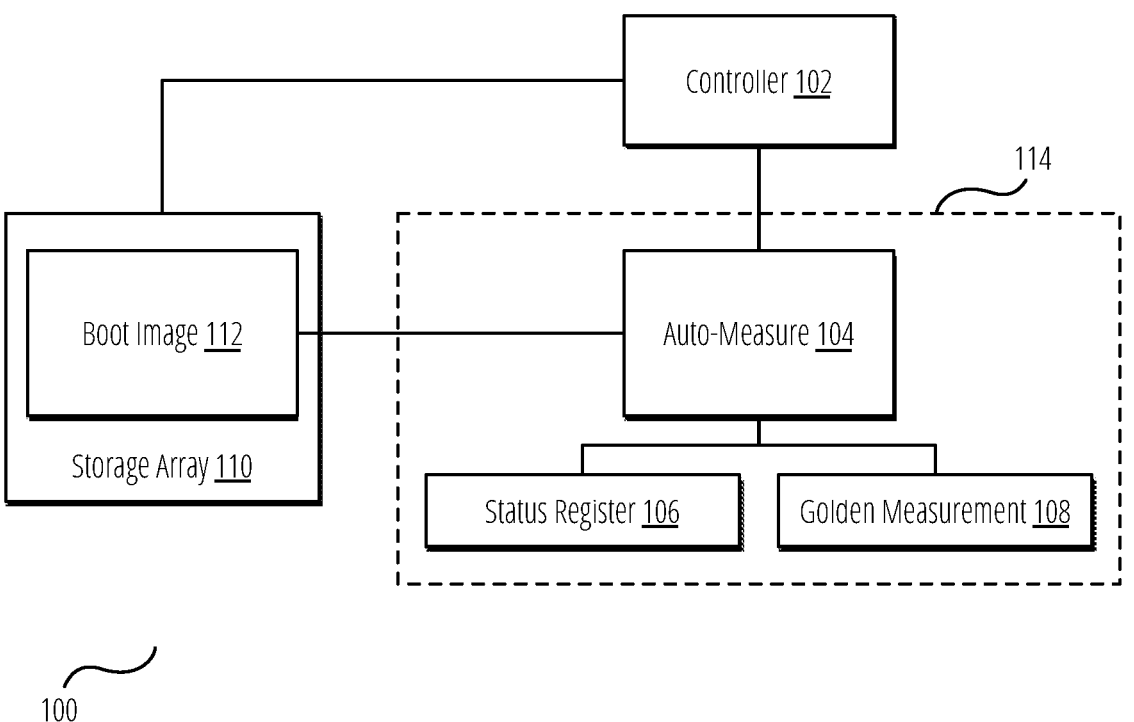
FIG. 1 is a block diagram illustrating an automotive computing system.

The disclosure remedies these and other deficiencies in existing automotive computing systems by providing an improved boot procedure that provides the benefits of secure or measured booting while avoiding latency during startup.

In brief, the disclosure provides systems, methods, and computer-readable media for detecting that a vehicle's computing system is about to shut down (e.g., upon turning off the ignition of a vehicle). In response, the vehicle computing system measures one or more layers of the operating system and/or firmware to obtain measurement values thereof. In some implementations, this measurement is performed via hardware and is not susceptible to software-based attacks or vulnerabilities. After measuring, the computing system can determine if the measurement is equal to a golden measurement. If so, the computing system can positively update a status register, and if not, the computing system can negatively update the status register. Then, during the next startup, the computing system can inspect the status register to determine if the computing system can securely boot.

In some aspects, the techniques described herein relate to a system including: a storage array; a controller, the controller configured to detect booting of the system; and an auto-measure circuit configured to: read a status register, the status register storing a state of data stored in the storage array, measure the data to generate a measurement, if a value stored in the status register indicates the data is compromised, compare the measurement to a golden measurement, halt booting if the measurement does not match the golden measurement, and continue booting if the measurement matches the golden measurement.

In some aspects, the techniques described herein relate to a system, wherein the auto-measure circuit is configured to read the status register by reading a bit of the status register.

In some aspects, the techniques described herein relate to a system, wherein the golden measurement is written by a manufacturer of the system.

In some aspects, the techniques described herein relate to a system, wherein the auto-measure circuit is configured to extend the golden measurement to a platform configuration register (PCR) of the system.

In some aspects, the techniques described herein relate to a system, wherein the controller is further configured to detect a shutdown and instruct the auto-measure circuit to update the status register.

In some aspects, the techniques described herein relate to a system, wherein the auto-measure circuit, in response to an instruction from the controller in response to the shutdown, is configured to: measure the data to generate a second measurement; compare the second measurement to the golden measurement; update the status register as negative if the second measurement does not match the golden measurement; and update the status register as positive if the second measurement matches the golden measurement.

In some aspects, the techniques described herein relate to a system, wherein updating the status register as negative includes setting a bit of the status register to logical zero and wherein updating the status register as positive includes setting a bit of the status register to logical one.

In some aspects, the techniques described herein relate to a system, wherein the controller is configured to instruct the system to transmit a message to a user device upon determining that the second measurement does not match the golden measurement.

In some aspects, the techniques described herein relate to a method including: reading a status register, the status register storing a state of data stored in a storage array; measuring the data to generate a measurement, if a value stored in the status register indicates the data is compromised; comparing the measurement to a golden measurement; halting booting if the measurement does not match the golden measurement; and continuing booting if the measurement matches the golden measurement.

In some aspects, the techniques described herein relate to a method, further including reading the status register by reading a bit of the status register.

In some aspects, the techniques described herein relate to a method, further including extending the golden measurement to a platform configuration register (PCR).

In some aspects, the techniques described herein relate to a method, further including detecting a shutdown and updating the status register.

In some aspects, the techniques described herein relate to a method, further including: measuring the data to generate a second measurement in response to the shutdown; comparing the second measurement to the golden measurement; updating the status register as negative if the second measurement does not match the golden measurement; and updating the status register as positive if the second measurement matches the golden measurement.

In some aspects, the techniques described herein relate to a method, wherein updating the status register as negative includes setting a bit of the status register to logical zero and wherein updating the status register as positive includes setting a bit of the status register to logical one.

In some aspects, the techniques described herein relate to a method, further including transmitting a message to a user device upon determining that the second measurement does not match the golden measurement.

In some aspects, the techniques described herein relate to a device including: a status register storing a state of data stored in a storage array; a golden measurement register; and an auto-measure circuit to: read the status register; measure the data to generate a measurement, if a value stored in the status register indicates the data is compromised; compare the measurement to a value stored in the golden measurement register; halt booting if the measurement does not match the value of the golden measurement register; and continue booting if the measurement matches the value of the golden measurement register.

In some aspects, the techniques described herein relate to a device, wherein the auto-measure circuit is further configured to read the status register by reading a bit of the status register.

In some aspects, the techniques described herein relate to a device, wherein the auto-measure circuit is further configured to: measure the data to generate a second measurement; compare the second measurement to the value of the golden measurement register; update the status register as negative if the second measurement does not match the value of the golden measurement register; and update the status register as positive if the second measurement matches the value of the golden measurement register.

In some aspects, the techniques described herein relate to a device, wherein updating the status register as negative includes setting a bit of the status register to logical zero and wherein updating the status register as positive includes setting a bit of the status register to logical one.

In some aspects, the techniques described herein relate to a device, wherein the auto-measure circuit is further configured to instruct a device to transmit a message to a user device upon determining that the second measurement does not match the value of the golden measurement register.

FIG. 1 is a block diagram illustrating an automotive computing system. Although the following description is directed toward an automotive computing system, the disclosure is not limited as such. Indeed, any computing system may utilize the components described in FIG. 1 or the methods described in FIGS. 2 through 4.

The automotive computing system 100 includes a controller 102 that accesses data (such as a boot image 112) stored in a storage array 110. The automotive computing system 100 further includes a security perimeter 114, such as a hardware security module (HSM), trusted platform module (TPM), secure enclave, trusted execution environment (TEE), or similar secure computing platform. The security perimeter 114 includes an auto-measure circuit 104, a status register 106, and a golden measurement register 108. Details of these components are described in more detail herein.

At its core, the automotive computing system 100 includes a storage array 110. Storage array 110 may also be referred to as an electronic memory apparatus. Storage array 110 includes memory cells that are programmable to store different states. Each memory cell may be programmable to store two states, denoted a logic 0 and a logic 1. In some cases, a memory cell is configured to store more than two logic states. A memory cell may store a charge representative of the programmable states in a capacitor; for example, a charged and uncharged capacitor may represent two logic states, respectively. DRAM architectures may commonly use such a design, and the capacitor employed may include a dielectric material with linear or paraelectric electric polarization properties as the insulator. By contrast, a ferroelectric memory cell may include a capacitor with a ferroelectric as the insulating material. Different levels of charge of a ferroelectric capacitor may represent different logic states. Ferroelectric materials have non-linear polarization properties; some details and advantages of a ferro-electric memory cell are discussed below.

Storage array 110 may be a three-dimensional (3D) memory array, where two-dimensional (2D) memory arrays are formed on top of one another. This may increase the number of memory cells that may be formed on a single die or substrate as compared with 2D arrays, which in turn may reduce production costs or increase the performance of the memory array, or both. Storage array 110 can include two levels of memory cells and may thus be considered a three-dimensional memory array; however, the number of levels is not limited to two. Each level may be aligned or positioned so that memory cells may be approximately aligned with one another across each level, forming a memory cell stack.

In some embodiments, memory cells of the storage array 110 may be chalcogenide-based memory cells that are arranged with other such memory cells in a three-dimensional (3D) architecture, such as a cross-point architecture, or arranged in a three-dimensional (3D) vertical architecture. Cross-point memory (e.g., 3D XPoint memory) uses an array of non-volatile memory cells. The memory cells in cross-point memory are transistor-less. Each of such memory cells can have a selector device and optionally a phase-change memory device that are stacked together as a column in an integrated circuit. Memory cells of such columns are connected in the integrated circuit via two layers of wires running in directions that are perpendicular to each other. One of the two layers is above the memory cells, and the other layer is below the memory cells. Thus, each memory cell can be individually selected at a cross point of two wires running in different directions in two layers. Crosspoint memory devices are fast and non-volatile and can be used as a unified memory pool for processing and storage.

In some implementations, the cross-point memory uses a memory cell that has an element (e.g., a sole element) acting both as a selector device and a memory device. For example, the memory cell can use a single piece of alloy with variable threshold capability. The read/write operations of such a memory cell can be based on thresholding the memory cell while inhibiting other cells in sub-threshold bias, in a way similar to the read/write operations for a memory cell having a first element acting as a selector device and a second element acting as a phase-change memory device that are stacked together as a column. A selector device usable for storing information can be referred to as a selector/memory device.

Such a self-selecting memory cell, having a selector/memory device, can be programmed in cross-point memory to have a threshold voltage window. The threshold voltage window can be created by applying programming pulses with opposite polarity to the selector/memory device. For example, the memory cell can be biased to have a positive voltage difference between two sides of the selector/memory device and, alternatively, to have a negative voltage difference between the same two sides of the selector/memory device. When the positive voltage difference is considered in positive polarity, the negative voltage difference is considered in negative polarity, which is opposite to the positive polarity. Reading can be performed with a given/fixed polarity. When programmed, the memory cell has a low threshold (e.g., lower than the cell that has been reset or a cell that has been programmed to have a high threshold), such that during a read operation, the read voltage can cause a programmed cell to snap and thus become conductive while a reset cell remains non-conductive.

The storage array 110 can store various persistent data used by controller 102. The automotive computing system 100 may include various other components (not illustrated) to create a vehicle network or similar type of automotive computer system. In some implementations, the controller 102 can be part of, and the automotive computing system 100 can comprise, a storage device (e.g., solid-state drive) used in such a network. As illustrated, one type of data stored in storage array 110 includes a boot image 112. In general, the boot image 112 can be responsible for booting at least one other computing device in the vehicle network. For example, the boot image 112 can be a first-stage bootloader, second-stage bootloader, operating system, or another type of software executed by another computing device in the vehicle network. In general, controller 102 can read the boot image 112 from the storage array 110 and return the boot image 112 to another computing device for execution. In other implementations, controller 102 may execute the boot image 112 directly.

As illustrated, controller 102 may communicate with the auto-measure circuit 104 during access operations performed on the storage array 110. For example, controller 102 may communicate with the auto-measure circuit 104 during startup (described in more detail in the description of FIG. 3) and shutdown (described in more detail in the description of FIG. 4).

In brief, during startup, controller 102 may cede control to auto-measure circuit 104 to confirm that the boot image 112 is valid prior to returning the boot image 112 to another computing device or executing the boot image 112 directly. The auto-measure circuit 104 may read one or more bits from the status register 106 and determine if the boot image 112 is valid based on the one or more bits in the status register 106. For example, a designated bit of the status register 106 may be set to logical one if the boot image 112 is valid and logical zero if the boot image 112 is invalid. If the auto-measure circuit 104 determines that the boot image 112 is valid, it transmits a message or response to controller 102, and controller 102 can then return or execute the boot image 112. Conversely, if the auto-measure circuit 104 determines that the boot image 112 is invalid, it can initiate a new measurement of the boot image 112 and compare the new measurement to the value stored in golden measurement register 108. If the values are equal, the auto-measure circuit 104 can similarly transmit a message or response to controller 102, and controller 102 can then return or execute the boot image 112. By contrast, if the new measurement is not equal to the value stored in golden measurement register 108, the auto-measure circuit 104 can transmit a message to controller 102 indicating as such and controller 102 can halt booting of the boot image 112 (or perform other types of remedial measures, described later). Further detail on a startup procedure is provided in the description of FIG. 3 and is not repeated herein.

During shutdown, controller 102 can instruct the auto-measure circuit 104 to initiate an auto-measurement procedure wherein the auto-measure circuit 104 measures the boot image 112 to obtain a new measurement. The auto-measure circuit 104 can then compare the new measurement to the value in the golden measurement register 108. If the values are equal, the auto-measure circuit 104 can positively update the status register 106. If not, the auto-measure circuit 104 can negatively update the status register 106. Further, if the values do not match, the auto-measure circuit 104 can inform controller 102, which can initiate remedial actions such as notifying a user (via a computing device). Further detail on a shutdown procedure is provided in the description of FIG. 4 and is not repeated herein.

Figure 2:
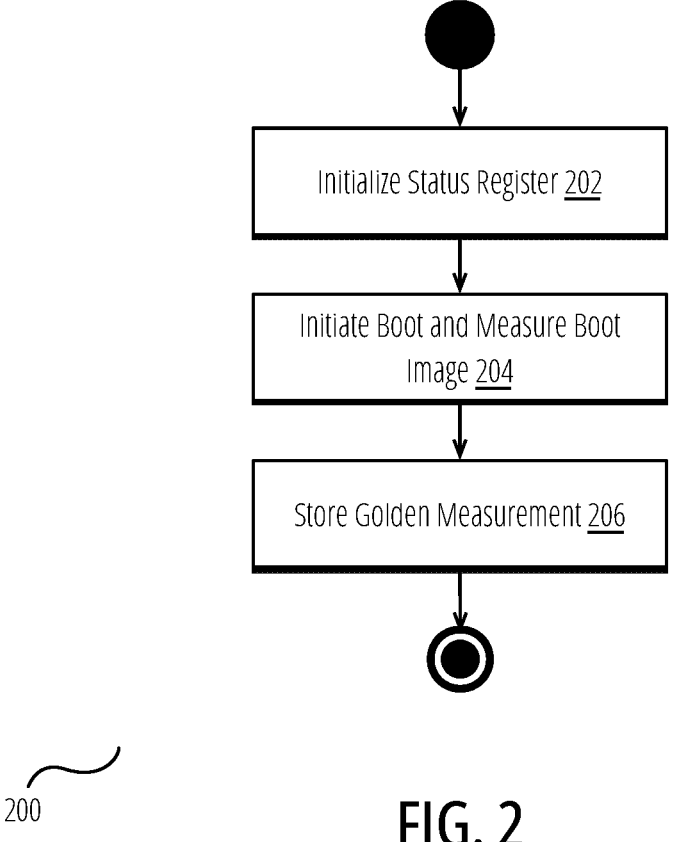
FIG. 2 is a flow diagram illustrating a method for initializing a golden measurement of a memory device.

FIG. 2 is a flow diagram illustrating a method for initializing a golden measurement of a memory device.

In step 202, method 200 can include initializing a status register.

In some implementations, the status register can comprise a multi-bit register storing configuration data for a memory device. In some scenarios, the status register can include a plurality of bits representing different configuration settings. In some implementations, the status register can include a single bit for managing the status of a boot image (e.g., whether a boot image or other data is compromised or not). For example, if a register includes sixteen bits, a first (or any) bit can be designated to store the status of a boot image or other data. As will be discussed, this bit can be updated on shutdown of a device to keep the status up to date. While a single bit is described, other configurations may be used (e.g., multiple bits, an entire register, etc.). Further, references to updating or otherwise accessing a status register refer equally to accessing a designated bit of the status register, and the disclosure should be limited in any manner. Further, although a single boot image and single status register (or bit) are described, the methods described herein can be applied to multiple boot images (using multiple status registers or bits).

In step 204, method 200 can include initiating a boot and measuring a boot image.

In some implementations, the status register can be updated during, for example, manufacturing or an initial device setup stage. In either case, step 204 is generally executed when it can be confirmed that a boot image is not compromised. For example, during the manufacturing of a device having the status register (e.g., NAND Flash device or another memory device), the manufacturer may initialize the status register. In one implementation, a status register or bit representing a non-compromised image is referred to as being in a "positive" state, while a status register or bit representing a compromised image is referred to as being in a "negative" state. In some implementations, a positive state can be represented as a binary one, while a negative state can be represented as binary zero. Certainly, the reverse may also be used in some implementations.

In some implementations, method 200 can include (in step 204) measuring the boot image. In some implementations, this measurement (performed in a secure state) is used as a golden measurement that will be used in later comparisons (discussed herein). Various techniques for measuring images can be used and the disclosure is not limited to as such. For example, a hash of the image can be computed and used as the measurement.

In step 206, method 200 can include storing a value for a golden measurement in a golden measurement register.

In one implementation, the golden measurement created in step 204 can be persisted to the device. A manufacturer (or similar entity) can write the golden measurement to a dedicated golden measurement register. In some implementations, the golden measurement register (and the status register) can be situated within a security perimeter implemented by, for example, a TPM, TEE, secure enclave, HSM, or similar technology. In some implementations, the golden measurement can be extended to a platform configuration (PCR) register via an auto-measure circuit (discussed above). In some implementations, the auto-measure circuit can also be situated in the security perimeter and thus may be capable of accessing the status register (while components outside the security perimeter may have no access to the status register).

As will be discussed next, the startup and shutdown procedure of the device storing the above register values is modified to support a rapid measurement procedure that can provide the benefits of secure booting without incurring the latency during startup.

Figure 3:
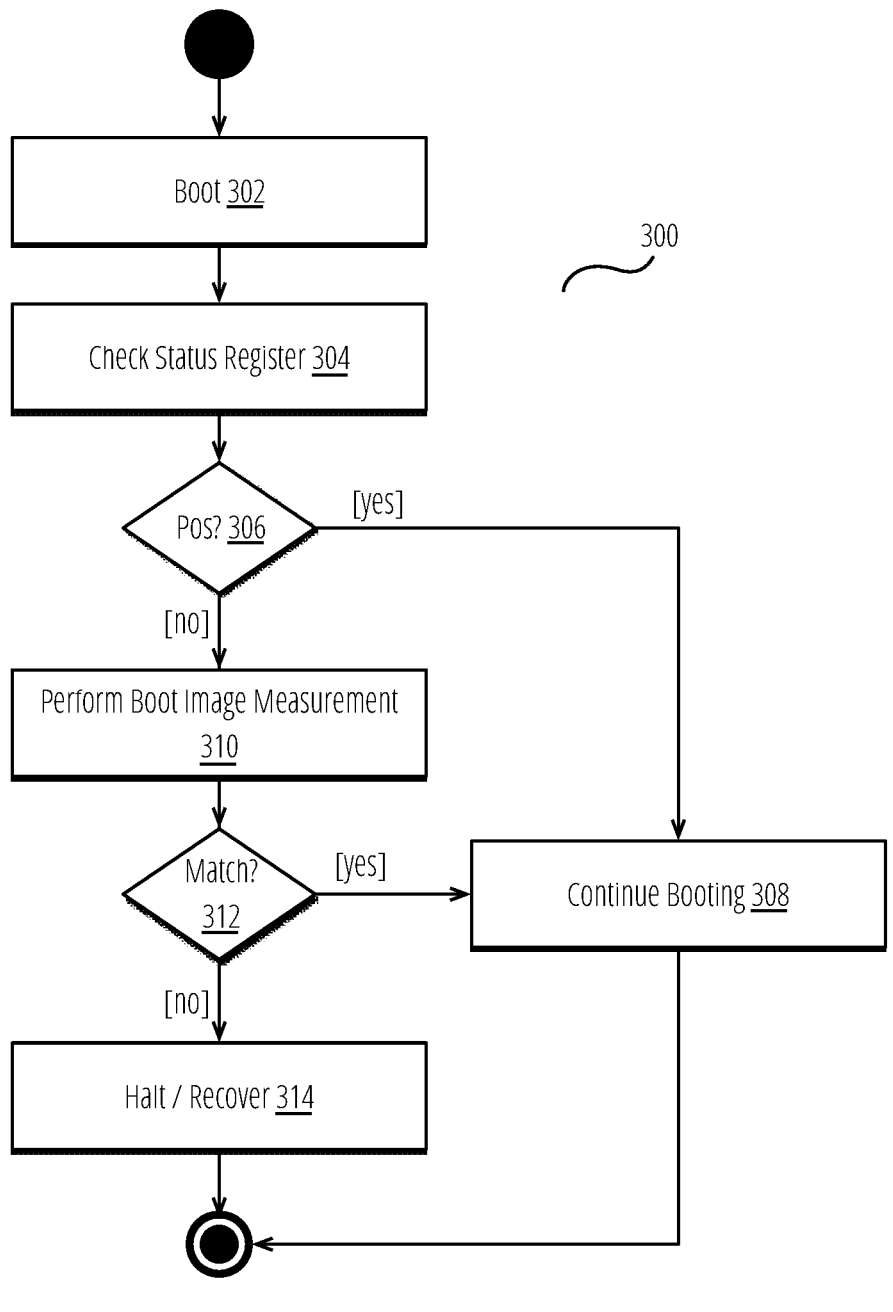
FIG. 3 is a flow diagram illustrating a method for booting an automotive computing system.

FIG. 3 is a flow diagram illustrating a method for booting an automotive computing system.

In step 302, method 300 can include booting a device.

As discussed above, the device can be a memory device or can be a computing system that includes such a memory device. In general, booting may involve numerous steps not relevant to method 300. However, booting will involve accessing a memory device to read data from a storage array (generally a boot image or similar type of data). As such, in some implementations, step 302 includes a memory device detecting a boot or startup and, in some implementations, an attempt to access data stored in the storage array. In some implementations, the memory device stores locations of boot images and can thus detect accesses to such locations to trigger further processing.

In step 304, method 300 can include checking a status register.

In some implementations, a controller of a memory device receives all requests for data stored in the storage array. As discussed above, in some implementations, the controller can determine if the request is for a designated memory location that stores, for example, a boot image or similar type of data that needs to be check for compromise. If so, controller can cede control to an auto-measure circuit before responding to the request.

The auto-measure circuit can access the status register and read, for example, a bit of the status register to determine the state of the requested image.

In some implementations, the auto-measure circuit can include a circuit that is hard-wired to a designated bit of the status register. In other implementations, the auto-measure circuit can include a programmable memory device that can map memory locations to status register bits and used to read specific locations of the status register in response to a memory address. In both implementations, the status register can return either a positive (e.g., binary one) or negative (e.g., binary zero) result indicating whether the boot image is not compromised or compromised, respectively. As will be discussed, the auto-measure circuit will not measure the boot image at this stage but rely on the value of the status register to determine how to proceed (discussed next).

In step 306, method 300 can include determining if the status register stores a positive value.

As discussed above, a positive value in the status register indicates that the corresponding boot image is not compromised. As such, in step 308, method 300 can include continue booting when the value of the status register includes a positive value (e.g., binary one). In some implementations, the output of the status register can be latched to either a return signal (indicating a positive result) or a sub-circuit that performs measurement (when a negative result is stored). As such, if the status register is positive, the auto-measure circuit can return a positive response to the controller. In response, the controller can proceed to read the boot image and return the data to the calling device. In some implementations, the controller can execute the boot image as well. By contrast, if the value in the status register is negative (e.g., binary zero), method 300 can proceed to step 310.

In some implementations, step 308 can also include setting the status register to a negative value. As will be discussed in FIG. 4, the status register will be updated again on shutdown. However, in this implementation, setting the status register to negative in step 308 can be done to anticipate corruption or compromise after startup but before shutdown. For example, an improper shutdown (due to compromised data) can bypass a shutdown procedure. By setting the status register to negative, any future startups after such an improper shutdown will force a re-measurement of the boot image to detect compromised data.

In step 310, method 300 can include measuring a boot image identified by the address received by the auto-measure circuit.

In some implementations, the auto-measure circuit can read the boot image directly from the storage array. In other implementations, the auto-measure circuit can request that the controller read the boot image and return the data to the auto-measure circuit.

In either scenario, the auto-measure circuit receives the boot image and can generate a measurement. In some implementations, the measurement can be a hash of the boot image, although other measurement methodologies may be used. In some implementations, the auto-measure circuit can implement a measurement generation algorithm via circuitry (e.g., a SHA-256 circuit) such that the measurement can be performed entirely in hardware. In other implementations, the measurement generation algorithm can be implemented via software and a general-purpose processing unit. In both scenarios, the measurement generation algorithm can be implemented within the security perimeter to prevent tampering.

Figure 4:
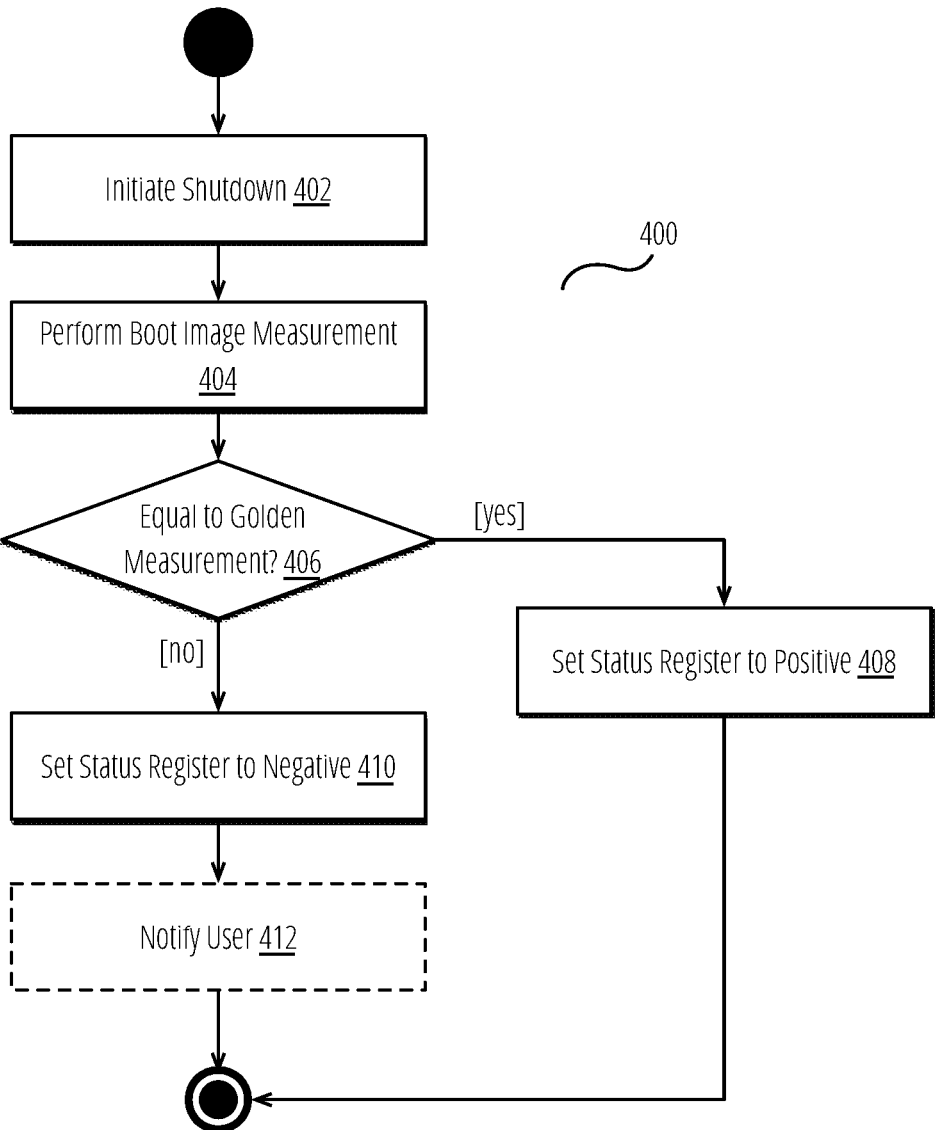
FIG. 4 is a flow diagram illustrating a method for shutting down an automotive computing system.

Notably, step 310 is only performed if the system detects a compromised image during shutdown (discussed in FIG. 4). As such, the system bypasses the computationally intensive measurement process on startup when the image is verified as non-compromised during shutdown.

In step 312, method 300 can include determining if the measurement performed in step 310 matches a golden measurement. In some implementations, step 312 can include determining if the measurement performed in step 310 exactly matches the golden measurement stored in a golden measurement register. If the measurement and the golden measurement match, method 300 can confirm that the boot image is not compromised and, in step 310 (described above), can continue booting from the boot image. By contrast, in step 314, method 300 can halt booting and, optionally, attempt to recover if the measurements do not match (indicating a compromised boot image). For example, step 314 can include loading a golden boot image (e.g., stored in the security perimeter) to allow the system to boot to a safe state. Alternatively, or in conjunction with the foregoing, step 314 can include executing in a safe mode or recovery mode and not allowing access to higher level code. Alternatively, or in conjunction with the foregoing, step 314 can include warning the user that the boot image was compromised and allowing the user to handle the compromised code appropriately.

FIG. 4 is a flow diagram illustrating a method for shutting down an automotive computing system.

In step 402, method 400 can include initiating a shutdown.

Similar to step 302, shutting down may involve numerous steps not relevant to method 400. However, shutting down will involve issuing a command to a memory device to commence shutting down. As such, in some implementations, step 402 includes a memory device detecting a shutdown event. In general, the host device may await a confirmation from the memory device of handling the shutdown event before fully shutting down. Thus, in some implementations, method 400 can be implemented before the system completely shuts down (or otherwise is suspended).

In step 404, method 400 can measure a boot image. Details of measuring a boot image by an auto-measure circuit were provided in step 310 and are not repeated herein but are incorporated in the description of step 404 in their entirety. Note that unlike step 310, method 400 may perform the measurement in step 404 on each shut down of the computing system.

In step 406, method 400 can include determining if the measurement performed in step 404 matches a golden measurement. In some implementations, step 404 can include determining if the measurement performed in step 404 exactly matches the golden measurement stored in a golden measurement register.

If the measurement and the golden measurement match, method 400 can confirm that the boot image is not compromised. In such a scenario, method 400 can proceed to step 408 where method 400 sets the status register to a positive value. As discussed above, this can comprise setting a pre-defined bit of the status register to a binary one value, indicating the boot image is not compromised.

By contrast, if method 400 determines that the measurement from step 404 does not match the golden measurement, method 400 proceeds to step 410, wherein method 400 can set the status register to a negative value. As discussed above, this can comprise setting a pre-defined bit of the status register to a binary zero value, indicating the boot image is compromised.

Further, in an optional implementation, method 400 can then notify a user in step 412. In such an implementation, step 412 can include transmitting a message to a user device upon determining that the measurement of step 404 does not match the golden measurement. In some implementation, the memory device implementing method 400 can transmit the message directly. For example, the auto-measure circuit can indicate the mismatch to a controller which can generate a message and transmit the message to a user via a network interface communicatively coupled to the memory device via shared bus. As an alternative, method 400 can include the memory device transmitting the mismatch notification to a host processor which can generate and send a message to the user device. The message can include, for example, a text message, email, visual display on the screen of an in-vehicle device implementing the method, or other similar type of display. As such, the message can be sent to a separate user device (e.g., mobile phone, smart key, tablet, etc.) or to an in-vehicle device.

In response, the user can perform various actions, which are not limited herein. For example, the user can try to reboot the device (e.g., restart the vehicle) in which method 300 will re-execute and re-measure the boot image (potentially resolving transient issues) or attempt to recover the state of the boot image as discussed in FIG. 3. Further, the user can physically bring the device (and/or vehicle) to a technician for repair. Since the measurement is performed on shutdown, the user will not need to wait until the next time they start the device (e.g., vehicle) to notice that the system is compromised. Therefore, the user can be alerted to the issue earlier and have more time to fix the issue.

Figure 5:
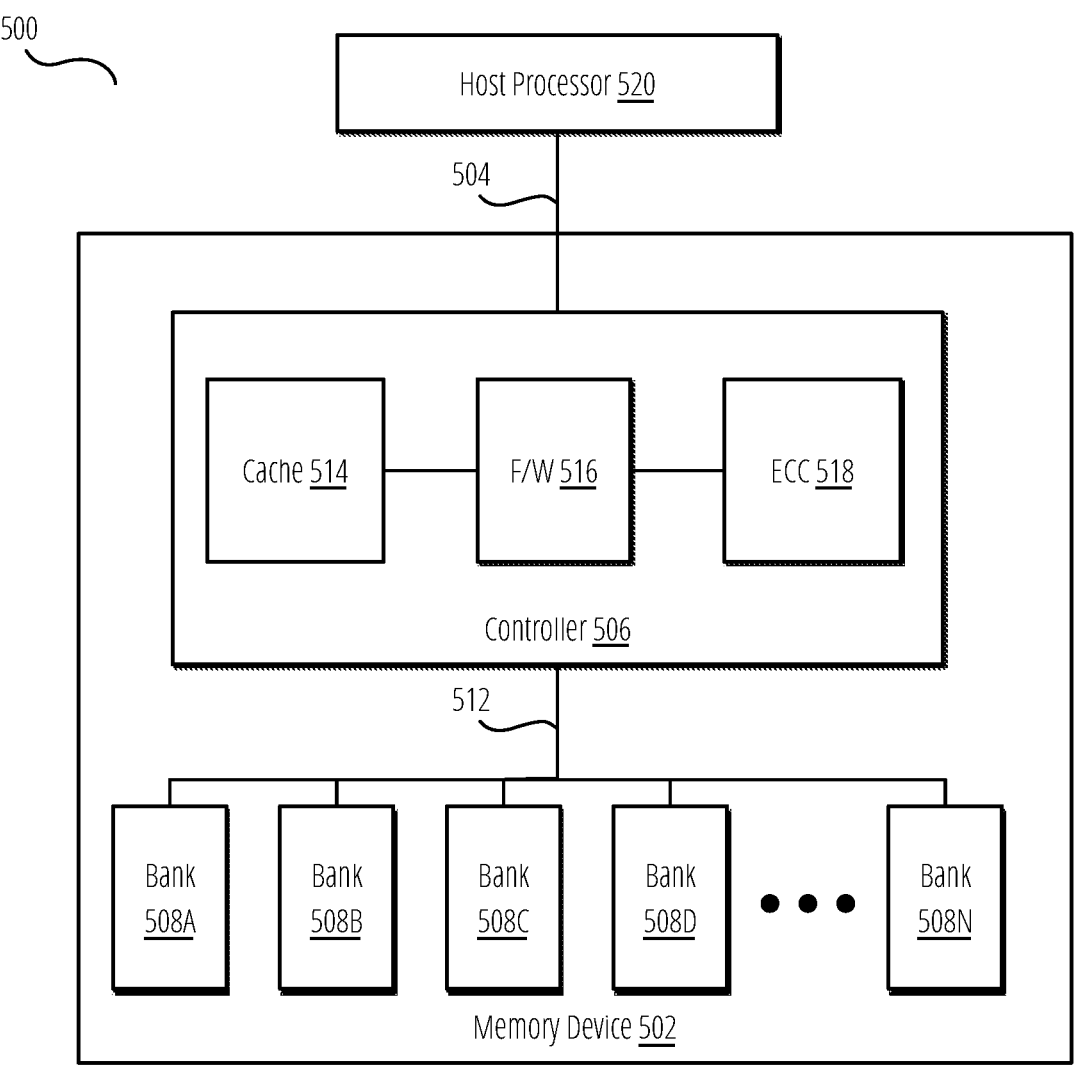
FIG. 5 is a block diagram illustrating a computing system.

FIG. 5 is a block diagram illustrating a computing system.

As illustrated in FIG. 5, a computing system 500 includes a host processor 520 communicatively coupled to a memory device 502 via a bus 504. The memory device 502 comprises a controller 506 communicatively coupled to one or more memory banks (e.g., bank 508A, bank 508B, bank 508C, bank 508D, bank 508N, etc.), forming a memory array via an interface 512. As illustrated, the controller 506 includes a local cache 514, firmware 516, and an ECC module 518.

In the illustrated embodiment, host processor 520 can comprise any type of computer processors, such as a central processing unit (CPU), graphics processing unit (GPU), or other types of general-purpose or special-purpose computing devices. The host processor 520 includes one or more output ports that allow for the transmission of address, user, and control data between the host processor 520 and the memory device 502. In the illustrated embodiment, this communication is performed over bus 504. In one embodiment, the bus 504 comprises an input/output (I/O) bus or a similar type of bus.

The memory device 502 is responsible for managing one or more memory banks (e.g., bank 508A, bank 508B, bank 508C, bank 508D, bank 508N, etc.). In one embodiment, the memory banks (e.g., bank 508A, bank 508B, bank 508C, bank 508D, bank 508N, etc.) comprise NAND Flash dies or other configurations of non-volatile memory. In one embodiment, the memory banks (e.g., bank 508A, bank 508B, bank 508C, bank 508D, bank 508N, etc.) comprise a memory array.

The memory banks (e.g., bank 508A, bank 508B, bank 508C, bank 508D, bank 508N, etc.) are managed by controller 506. In some embodiments, the controller 506 comprises a computing device configured to mediate access to and from banks (e.g., bank 508A, bank 508B, bank 508C, bank 508D, bank 508N, etc.). In one embodiment, the controller 506 comprises an ASIC or other circuitry installed on a printed circuit board housing the memory banks (e.g., bank 508A, bank 508B, bank 508C, bank 508D, bank 508N, etc.). In some embodiments, the controller 506 may be physically separate from the memory banks (e.g., bank 508A, bank 508B, bank 508C, bank 508D, bank 508N, etc.). The controller 506 communicates with the memory banks (e.g., bank 508A, bank 508B, bank 508C, bank 508D, bank 508N, etc.) over interface 512. In some embodiments, this interface 512 comprises a physically wired (e.g., traced) interface. In other embodiments, interface 512 comprises a standard bus for communicating with memory banks (e.g., bank 508A, bank 508B, bank 508C, bank 508D, bank 508N, etc.).

The controller 506 comprises various modules, including local cache 514, firmware 516, and ECC module 518. In one embodiment, the various modules (e.g., local cache 514, firmware 516, and ECC module 518) comprise various physically distinct modules or circuits. In other embodiments, the modules (e.g., local cache 514, firmware 516, and ECC module 518) may completely (or partially) be implemented in software or firmware.

As illustrated, firmware 516 comprises the core of the controller and manages all operations of controller 506. The firmware 516 may implement some or all of the methods described above. Specifically, firmware 516 may implement the methods described in the foregoing figures.

Figure 6:
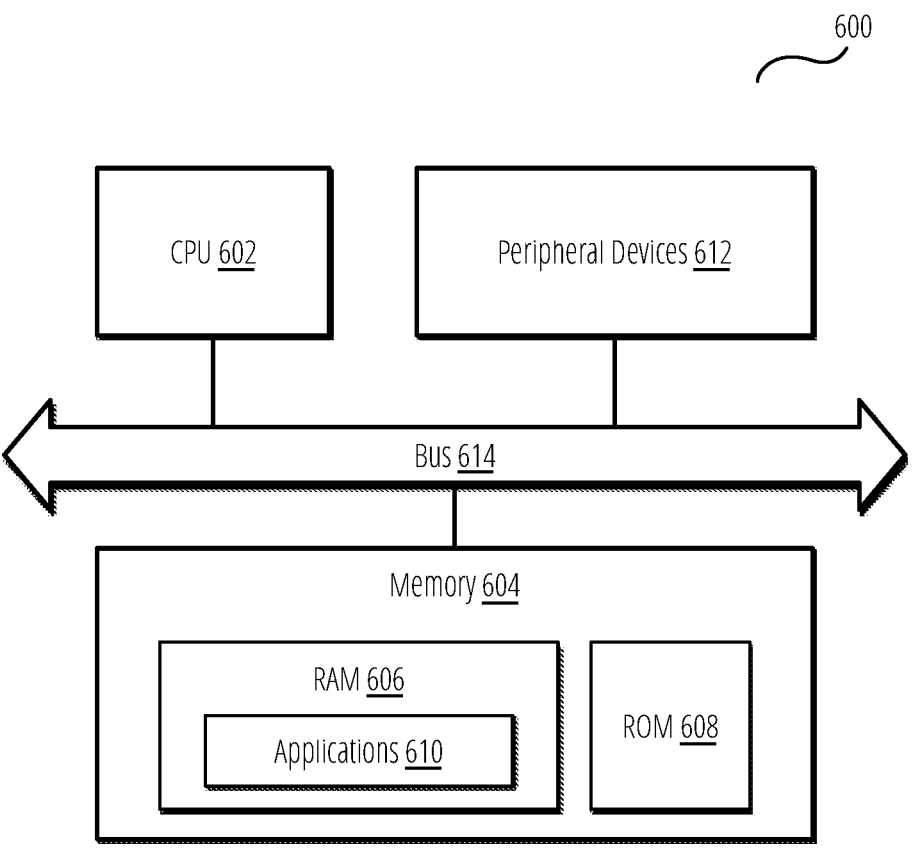
FIG. 6 is a block diagram of a computing device.

FIG. 6 is a block diagram of a computing device.

As illustrated, the device 600 includes a processor or central processing unit (CPU) such as CPU 602 in communication with a memory 604 via a bus 614. The device also includes one or more input/output (I/O) or peripheral devices 612. Examples of peripheral devices include, but are not limited to, network interfaces, audio interfaces, display devices, keypads, mice, keyboards, touch screens, illuminators, haptic interfaces, global positioning system (GPS) receivers, cameras, or other optical, thermal, or electromagnetic sensors.

In some embodiments, the CPU 602 may comprise a general-purpose CPU. The CPU 602 may comprise a single-core or multiple-core CPU. The CPU 602 may comprise a system-on-a-chip (SoC) or a similar embedded system. In some embodiments, a graphics processing unit (GPU) may be used in place of, or in combination with, a CPU 602. Memory 604 may comprise a memory system including a dynamic random-access memory (DRAM), static random-access memory (SRAM), Flash (e.g., NAND Flash), or combinations thereof. In one embodiment, bus 614 may comprise a Peripheral Component Interconnect Express (PCIe) bus. In some embodiments, bus 614 may comprise multiple busses instead of a single bus.

Memory 604 illustrates an example of a non-transitory computer storage media for the storage of information such as computer-readable instructions, data structures, program modules, or other data. Memory 604 can store a basic input/output system (BIOS) in read-only memory (ROM), such as ROM 608, for controlling the low-level operation of the device. The memory can also store an operating system in random-access memory (RAM) for controlling the operation of the device.

Applications 610 may include computer-executable instructions that, when executed by the device, perform any of the methods (or portions of the methods) described previously in the description of the preceding figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The device may optionally communicate with a base station (not shown) or directly with another computing device. One or more network interfaces in peripheral devices 612 are sometimes referred to as a transceiver, transceiving device, or network interface card (NIC).

An audio interface in peripheral devices 612 produces and receives audio signals such as the sound of a human voice. For example, an audio interface may be coupled to a speaker and microphone (not shown) to enable telecommunication with others or generate an audio acknowledgment for some action. Displays in peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 may comprise any input device arranged to receive input from a user. An illuminator in peripheral devices 612 may provide a status indication or provide light. The device can also comprise an input/output interface in peripheral devices 612 for communication with external devices, using communication technologies, such as USB, infrared, Bluetooth®, or the like. A haptic interface in peripheral devices 612 provides tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 6, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

These computer program instructions can be provided to a processor of a general purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and, as such, are not to be limited by the foregoing exemplary embodiments and examples. In other words, functional elements being performed by single or multiple components, in various combinations of hardware and software or firmware, and individual functions, may be distributed among software applications at either the client level or server level, or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software, or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

I claim:

1. A system comprising:
a storage array;
a controller configured to detect booting of the system; and
an auto-measure circuit configured to:
read a status register, the status register storing a state of data stored in the storage array,
measure the data to generate a measurement if a value stored in the status register indicates the data is compromised,
compare the measurement to a golden measurement,
halt booting if the measurement does not match the golden measurement, and
continue booting if the measurement matches the golden measurement,
wherein the controller is further configured to detect a shutdown and instruct the auto-measure circuit to update the status register.

2. The system of claim 1, wherein the auto-measure circuit is configured to read the status register by reading a bit of the status register.

3. The system of claim 1, wherein the golden measurement is written by a manufacturer of the system.

4. The system of claim 1, wherein the auto-measure circuit is configured to set the state of the status register to a negative state after booting.

5. The system of claim 1, wherein the auto-measure circuit, in response to an instruction from the controller in response to the shutdown, is configured to:
measure the data to generate a second measurement;
compare the second measurement to the golden measurement;
update the status register as negative if the second measurement does not match the golden measurement; and
update the status register as positive if the second measurement matches the golden measurement.

6. The system of claim 5, wherein updating the status register as negative comprises setting a bit of the status register to logical zero and wherein updating the status register as positive comprises setting a bit of the status register to logical one.

7. The system of claim 5, wherein the controller is configured to instruct the system to transmit a message to a user device upon determining that the second measurement does not match the golden measurement.

8. A method comprising:

reading a status register, the status register storing a state of data stored in a storage array;

measuring the data to generate a measurement, if a value stored in the status register indicates the data is compromised;

comparing the measurement to a golden measurement;

halting booting if the measurement does not match the golden measurement;

continuing booting if the measurement matches the golden measurement; and detecting a shutdown and updating the status register.

9. The method of claim 8, further comprising reading the status register by reading a bit of the status register.

10. The method of claim 8, further comprising setting the state of the status register to a negative state after booting.

11. The method of claim 8, further comprising:

measuring the data to generate a second measurement in response to the shutdown;

comparing the second measurement to the golden measurement;

updating the status register as negative if the second measurement does not match the golden measurement; and updating the status register as positive if the second measurement matches the golden measurement.

12. The method of claim 11, wherein updating the status register as negative comprises setting a bit of the status register to logical zero and wherein updating the status register as positive comprises setting a bit of the status register to logical one.

13. The method of claim 11, further comprising transmitting a message to a user device upon determining that the second measurement does not match the golden measurement.

14. A device comprising:

a status register storing a state of data stored in a storage array;

a golden measurement register; and an auto-measure circuit to:

read the status register;

measure the data to generate a measurement, if a value stored in the status register indicates the data is compromised;

compare the measurement to a value stored in the golden measurement register;

halt booting if the measurement does not match the value of the golden measurement register;

continue booting if the measurement matches the value of the golden measurement register; and update the status register in response to detecting a shutdown.

15. The device of claim 14, wherein the auto-measure circuit is further configured to read the status register by reading a bit of the status register.

16. The device of claim 14, wherein the auto-measure circuit is further configured to:

measure the data to generate a second measurement;

compare the second measurement to the value of the golden measurement register;

update the status register as negative if the second measurement does not match the value of the golden measurement register; and update the status register as positive if the second measurement matches the value of the golden measurement register.

17. The device of claim 16, wherein updating the status register as negative comprises setting a bit of the status register to logical zero and wherein updating the status register as positive comprises setting a bit of the status register to logical one.

18. The device of claim 16, wherein the auto-measure circuit is further configured to instruct a device to transmit a message to a user device upon determining that the second measurement does not match the value of the golden measurement register.

*   *   *   *   *